(12) United States Patent
Saitou et al.

(10) Patent No.: US 8,221,877 B2
(45) Date of Patent: Jul. 17, 2012

(54) FOAMED MEMBER, FOAMED MEMBER LAMINATE, AND ELECTRIC OR ELECTRONIC DEVICE USING FOAMED MEMBER

(75) Inventors: Makoto Saitou, Ibaraki (JP); Yasuyuki Tokunaga, Ibaraki (JP); Hideki Nagatsu, Ibaraki (JP)

(73) Assignee: Nitto Denko Corportion, Osaka (JP)

( * ) Notice: Subject to any disclaimer, the term of this patent is extended or adjusted under 35 U.S.C. 154(b) by 0 days.

(21) Appl. No.: 11/909,133

(22) PCT Filed: Apr. 6, 2006

(86) PCT No.: PCT/JP2006/307318
§ 371 (c)(1),
(2), (4) Date: Sep. 19, 2007

(87) PCT Pub. No.: WO2006/109666
PCT Pub. Date: Oct. 19, 2006

(65) Prior Publication Data
US 2009/0061206 A1 Mar. 5, 2009

(30) Foreign Application Priority Data

Apr. 8, 2005 (JP) .................................. 2005-112415
Feb. 27, 2006 (JP) .................................. 2006-049538

(51) Int. Cl.
*B32B 27/08* (2006.01)
*B32B 7/12* (2006.01)

(52) U.S. Cl. ............... 428/319.3; 428/319.7; 428/319.9; 428/317.1

(58) Field of Classification Search ............... 428/319.3, 428/319.7, 319.9, 317.1, 317.3
See application file for complete search history.

(56) References Cited

U.S. PATENT DOCUMENTS

| | | | | |
|---|---|---|---|---|
| 4,752,771 A * | 6/1988 | Katogi et al. | ................... | 345/88 |
| 5,000,991 A * | 3/1991 | Hayashi et al. | ............... | 428/36.5 |
| 5,188,882 A * | 2/1993 | Uchiyama et al. | ............ | 428/159 |
| 5,372,865 A * | 12/1994 | Arakawa et al. | ............. | 428/41.5 |
| 6,054,778 A * | 4/2000 | Downs | ......................... | 307/10.1 |
| 2004/0053061 A1 * | 3/2004 | Yonezawa et al. | ............ | 428/458 |
| 2004/0162358 A1 | 8/2004 | Yamamoto et al. | | |
| 2004/0242775 A1 * | 12/2004 | Tahara et al. | ................... | 525/89 |
| 2005/0031858 A1 * | 2/2005 | Tachibana | ..................... | 428/343 |
| 2005/0049322 A1 | 3/2005 | Kanada et al. | | |
| 2005/0053779 A1 * | 3/2005 | Saitou et al. | ............... | 428/304.4 |
| 2005/0119408 A1 * | 6/2005 | Shin | ............................... | 525/88 |
| 2007/0149630 A1 | 6/2007 | Yamamoto et al. | | |

FOREIGN PATENT DOCUMENTS

| | | |
|---|---|---|
| EP | 0320676 A2 | 6/1989 |
| EP | 1445209 A1 | 8/2004 |
| JP | 58-181632 A | 10/1983 |
| JP | 63-19287 A | 1/1988 |
| JP | 5024143 A | 2/1993 |
| JP | 9-123321 A | 5/1997 |
| JP | 9-131822 A | 5/1997 |
| JP | 10-37328 A | 2/1998 |
| JP | 10-176076 A | 6/1998 |
| JP | 2000-169803 A | 6/2000 |
| JP | 2002-309198 A | 10/2002 |
| JP | 2003-136647 A | 5/2003 |
| JP | 2003-277714 A | 10/2003 |
| JP | 2005-170434 A | 6/2005 |
| WO | 01/14142 A1 | 3/2001 |
| WO | 01/56777 A1 | 8/2001 |
| WO | WO 02084918 A2 * | 10/2002 |
| WO | 03/020825 A1 | 3/2003 |

OTHER PUBLICATIONS

International Search Report, Jul. 4, 2006.
Japanese Office Action issued on Jun. 14, 2011 in the corresponding Japanese Patent Application No. 2006-049538.
Extended European Search Report issued on Apr. 18, 2011 in the corresponding European Patent Application No. 06731266.0.
Japanese Office Action issued Sep. 6, 2011 in corresponding Japanese Patent Application No. 2006-049538.

\* cited by examiner

*Primary Examiner* — Hai Vo
(74) *Attorney, Agent, or Firm* — Sughrue Mion, PLLC

(57) ABSTRACT

The present invention provides a foamed member capable of inhibiting or preventing foam breakage at the time when the foam member is peeled from a carrier tape, even when the foamed member has a high expansion ratio. The foamed member has a thermoplastic resin foam layer containing a thermoplastic resin foam formed through a step of impregnating a high-pressure inert gas into a thermoplastic resin and subsequently reducing pressure, and at least one of a thermoplastic polyester-based resin layer and a thermoplastic elastomer resin layer disposed on at least one side of the thermoplastic resin foam layer.

5 Claims, No Drawings

FOAMED MEMBER, FOAMED MEMBER LAMINATE, AND ELECTRIC OR ELECTRONIC DEVICE USING FOAMED MEMBER

TECHNICAL FIELD

The present invention relates to a foamed member, a foamed member laminate, and an electric or electronic device using foamed member. More specifically, it relates to a foamed member capable of inhibiting or preventing foam breakage at the time when the foam member is peeled from a carrier tape, even when the foamed member has a high expansion ratio, as well as a foamed member laminate and an electric or electronic device using the foamed member.

BACKGROUND ART

In general, a foamed member is punched out in a required shape so as to correspond to the shape of a member to be used or processing for pressure-sensitive adhesiveness is applied on the surface of the foamed member in order to facilitate fixing thereof to the above member. However, since the foamed member to which such processing is applied is difficult to handle, a carrier tape is used in some cases in order to efficiently convey the member to a predetermined site. Namely, a foamed member is subjected to various kinds of processing such as punching and processing for pressure-sensitive adhesiveness and, after processing, is conveyed in a state where it is attached to a carrier tape. On the other hand, after processing, the foamed member is necessarily peeled from the carrier tape but the foamed member is sometimes broken at peeling when the strength of the surface of the foamed member is low (weak). Particularly, in the case of a foamed member having a high expansion ratio [e.g., a thermoplastic resin foam formed through a step of impregnating a high-pressure inert gas (e.g., carbon dioxide in a supercritical state or the like) into a thermoplastic resin and subsequently reducing pressure], the breakage at peeling was remarkable since thickness of cell wall is thin.

Incidentally, it is known to provide a resin layer on the surface of a foam for enhancing adhesiveness and sealing ability of the foam. For example, for the purpose of enhancing the sealing ability (reinforcement of the foamed layer and conveyance with a carrier tape are not considered), there has been proposed a foam having a soft coating film softer than a rubber foam provided on either of upper and lower surfaces of the rubber foam having both of independent cells and continuous cells (see Patent Document 1). Moreover, there has been proposed a foam excellent in toughness, scratch resistance, abrasion resistance, and the like, which is formed by forming a layer composed of a urethane-based thermoplastic polymer composition on the surface of a polyolefin-based resin foam and applying a surface-treating layer composed of a polar polymer on the above layer (see Patent Document 2). Furthermore, there has been also proposed a foam whose surface is treated with a polypropylene-based adhesive composition (see Patent Document 3), a foam having a layer easily soluble in water (polyvinyl alcohol layer or the like) provided on the surface of the foam (see Patent Document 4), and the like.

Patent Document 1: JP-A-9-131822
Patent Document 2: JP-A-2003-136647
Patent Document 3: JP-A-5-24143
Patent Document 4: JP-A-10-37328

DISCLOSURE OF THE INVENTION

Problems that the Invention is to Solve

Therefore, an object of the invention is to provide a foamed member capable of inhibiting or preventing foam breakage at the time when the foam member is peeled from a carrier tape, even when the foamed member has a high expansion ratio, as well as a foamed member laminate and an electric or electronic device using the foamed member.

Another object of the invention is to provide a foamed member excellent in re-workability, a foamed member laminate, and an electric or electronic device using the foamed member.

Means for Solving the Problems

As a result of the extensive studies for achieving the above objects, the present inventors found that, by forming a specific thermoplastic resin layer or thermoplastic elastomer resin layer on a surface of a foam, even when the thickness of cell wall is thin, the foam having a high expansion ratio can be effectively inhibited or prevented from foam breakage caused by thinness of cell wall at the time when the foam is peeled from a carrier tape. The invention is accomplished based on these findings.

Namely, the invention provides a foamed member comprising a thermoplastic resin foam layer containing a thermoplastic resin foam formed through a step of impregnating a high-pressure inert gas into a thermoplastic resin and subsequently reducing pressure; and at least one of a thermoplastic polyester-based resin layer and a thermoplastic elastomer resin layer disposed on at least one side of the thermoplastic resin foam layer.

As the above-mentioned thermoplastic resin constituting the thermoplastic resin foam layer, a polyolefin-based resin is suitable. The apparent density of the thermoplastic resin foam layer is preferably 0.2 g/cm³ or less.

Moreover, the glass transition temperature of the thermoplastic polyester-based resin constituting the thermoplastic polyester-based resin layer is preferably 20° C. or lower. The thermoplastic polyester-based resin layer preferably has a structure in which the thermoplastic polyester-based resin is crosslinked.

Furthermore, as the thermoplastic elastomer resin constituting the thermoplastic elastomer resin layer, a thermoplastic elastomer resin having a content ratio of a hard segment portion of less than 50% by mol can be preferably used. As the thermoplastic elastomer resin constituting the thermoplastic elastomer resin layer, a styrene-isoprene-styrene-based thermoplastic elastomer resin is preferred.

The invention also provides a foamed member laminate comprising the above-mentioned foamed member as a foamed member and a carrier tape supporting the foamed member, wherein the foamed member is adhered to the carrier tape in such a way that a surface of the thermoplastic polyester-based resin layer or the thermoplastic elastomer resin layer of the foamed member is brought into contact with a pressure-sensitive adhesive surface of the carrier tape.

The invention further provides an electric or electronic device comprising the above-mentioned foamed member as the foamed member.

Advantage of the Invention

The foamed member of the invention can inhibit or prevent foam breakage at peeling from a carrier tape even when the foamed member has a high expansion ratio. Furthermore, it is excellent in re-workability.

BEST MODE FOR CARRYING OUT THE INVENTION

Foamed Member

The foamed member of the invention has a thermoplastic resin foam layer of a thermoplastic resin foam formed through impregnating a high-pressure inert gas into a thermoplastic resin and subsequently reducing pressure, and a thermoplastic polyester-based resin layer and/or a thermoplastic elastomer resin layer disposed on at least one side of the thermoplastic resin foam layer. Thus, by providing a thermoplastic polyester-based resin layer and/or a thermoplastic elastomer resin layer on at least one side of the thermoplastic resin foam layer, strength of the surface of the thermoplastic resin foam layer can be effectively enhanced without affecting properties (e.g., elongation property, flexibility, and the like) of the thermoplastic resin foam layer. Therefore, the foamed member can be easily peeled without occurrence of foam breakage which causes breakage in the foam layer of the foamed member even when the foamed member is peeled from a carrier tape [particularly, it is peeled at a high speed (e.g., at a peeling rate of 10 m/min)] after various kinds of processing are applied in a state where it is adhered to the carrier tape.

Specifically, the foamed member is supported by a carrier tape at processing and conveyance and, after processing and conveyance, the foamed member is peeled from the carrier tape and then used. The behavior that the carrier tape supports the foamed member at such processing and conveyance relates to a peeling phenomenon at a low speed and it is necessary to have a sufficient adhesive strength (e.g., an adhesive strength of 0.6 N/20 mm or more as measured at the time when the foamed member is peeled at 23° C., 50 RH %, a tensile rate of 0.3 m/min, and a peeling angle of 180° C.). On the other hand, the behavior that the foamed member is peeled from the carrier tape relates to a peeling phenomenon at a high speed and it is necessary to peel the foamed member in a state of interfacial peeling where the foamed member is peeled at the interface between the carrier tape and the foamed member at the peeling at a high speed (high-speed peeling; e.g., the case where the tensile rate is 10 m/min).

Since the foamed member of the invention has the above constitution, the foamed member is supported by the carrier tape adhered thereto and has an adhesive strength of 0.6 N/20 mm or more at the time when the foamed member is peeled from the carrier tape at a low speed (e.g., an adhesive strength as measured at the time when it is peeled at 23° C., 50 RH %, a tensile rate of 0.3 m/min, and a peeling angle of 180° C.). Therefore, even when processing and conveyance are performed in a state where the foamed member is supported by the carrier tape, the foamed member is still supported by the carrier tape during processing and conveyance. On the other hand, after processing and conveyance in a state where the foamed member is supported by the carrier tape, the foamed member should be peeled from the carrier tape. Even when the foamed member is peeled from the carrier tape at a high speed (e.g., even when it is peeled at a tensile rate of 10 m/min), the foamed member can be peeled at the interface between the foamed member and the carrier tape and thus foam breakage which causes breakage in the foam layer of the foamed member is inhibited or prevented.

Furthermore, since the foamed member has the above constitution (particularly, by using as the thermoplastic polyester-based resin layer a thermoplastic polyester-based resin layer having a structure in which the thermoplastic polyester-based resin is crosslinked), an excellent re-workability can be exhibited. Specifically, the foamed member of the invention is possible to be easily peeled from an adherend without breaking the foamed member even after the foamed member is adhered to the adherend in a state of 50% compression of the foamed member and aged at 50° C. for 7 days. In this connection, the re-workability refers to a property that the foamed member does not attach to the resin surface or metal surface of a device case and the glass surface of an image-displaying part and can be easily peeled in the case where the member is installed on an electrical or electronic device or the like as a dust-proof material or a sealing material. When the foamed member is attached to the surface of the adherend as mentioned above, the foamed member is broken at the time when the device is disassembled for maintenance or the like and thus the member may not carry out the function as a dust-proof material or a sealing material. Moreover, when the foamed member cannot be easily peeled from the adherend, it becomes difficult to perform fractional recovery of individual materials at disassembling and thus, re-use of the materials may be inhibited. Therefore, it is preferable for the foamed member to have an excellent re-workability.

(Thermoplastic Polyester-Based Resin Layer)

The thermoplastic polyester-based resin layer formed on the thermoplastic resin foam layer is not particularly limited so long as it is a layer formed of a thermoplastic polyester-based resin. The thermoplastic polyester-based resin constituting the thermoplastic polyester-based resin layer is not particularly limited so long as it is a resin having an ester-bond site formed by the reaction (polycondensation) of a polyol component with a polycarboxylic acid component. Examples of the polyol component include diol components, e.g., aliphatic diols such as ethylene glycol, 1,3-trimethylene glycol, 1,4-butanediol, 2-methyl-1,3-propanediol, 1,5-pentanediol, neopentyl glycol, 2,2-dimethyl-1,3-propanediol, 1,6-hexanediol, 3-methyl-1,5-pentanediol, 2-methyl-2,4-pentanediol, 1,7-heptanediol, 2,2-diethyl-1,3-propanediol, 2-methyl-2-propyl-1,3-propanediol, 2-methyl-1,6-hexanediol, 1,8-octanediol, 2-butyl-2-ethyl-1,3-propanediol, 1,3,5-trimethyl-1,3-pentanediol, 1,9-nonanediol, 2,4-diethyl-1,5-pentanediol, 2-methyl-1,8-octanediol, 1,10-decanediol, 2-methyl-1,9-nonanediol, 1,18-octadecanediol, and dimer diols; alicyclic diols such as 1,4-cyclohexanediol, 1,3-cyclohexanediol, 1,2-cyclohexanediol, 1,4-cyclohexanedimethanol, 1,3-cyclohexanedimethanol, and 1,2-cyclohexanedimethanol; aromatic diols such as bisphenol A, ethylene oxide adducts of bisphenol A, bisphenol S, ethylene oxide adducts of bisphenol S, xylylene diol, and naphthalene diol; and ether glycols such as diethylene glycol, triethylene glycol, polyethylene glycol, and dipropylene glycol; and the like. In this connection, the polyol component may be a polyol component in the form of a polymer, such as a polyether polyol or a polyester polyol. Examples of the above polyester polyol include polyether diols such as polyethylene glycol, polypropylene glycol, and polytetramethylene glycol obtained by ring-opening polymerization of ethylene oxide, propylene oxide, tetrahydrofuran, and the like, and copolyethers obtained by copolymerization thereof. Furthermore, as the polyol component, for example, a polyhydric alcohol having trivalency or higher valency such as glycerin, trimethylol propane, 1,2,4-butanetriol, 1,2,5-pentanetriol, 1,2,6-hexanetriol, or pentaerythritol, dipentaerythritol can be also used.

Moreover, examples of the polycarboxylic acid component include dicarboxylic acid components, e.g., aromatic dicarboxylic acids such as terephthalic acid, isophthalic acid, 2,6-naphthalenedicarboxylic acid, 1,4-naphthalenedicarboxylic acid, and 4,4'-biphenyldicarboxylic acid; aliphatic dicarboxylic acids such as oxalic acid, succinic acid, methylsuccinic acid, glutaric acid, adipic acid, pimelic acid, azelaic acid, sebacic acid, 1,12-dodecanedioic acid, 1,14-tetradecanedioic acid, and dimer acid; alicyclic dicarboxylic acids such as 1,4-cyclohexanedicarboxylic acid, 1,3-cyclohexanedicarboxylic acid, and 1,2-cyclohexanedicarboxylic acid; and the like. Furthermore, as the polycarboxylic acid component, for example, a polybasic carboxylic acid having trivalency or higher valency such as 1,2,4-butanetricarboxylic acid, 1,2,5-hexanetricarboxylic acid, 1,2,4-cyclohexanetricarboxylic acid, trimellitic acid, or pyromellitic acid can be also used. In this connection, the polycarboxylic acid component may be any of acid anhydrides or lower alkyl esters of these carboxylic acids.

The polyol component and the polycarboxylic acid component each can be used solely or in combination of two or more thereof.

Specifically, specific examples of the thermoplastic polyester-based resin include polyethylene terephthalate, polyethylene naphthalate, polybutylene terephthalate, polybutylene naphthalate, and the like. The thermoplastic polyester-based resin can be used solely or in combination of two or more thereof.

In the invention, as the thermoplastic polyester-based resin, for example, a series of trade name "Viron" (manufactured by Toyobo Co., Ltd.) and the like can be preferably used. Specifically, examples thereof include "Viron 290" (glass transition temperature of 64° C.), "Viron 300" (glass transition temperature of 9° C.), "Viron GK-110" (glass transition temperature of 42° C.), "Viron 29SS" (one obtained by dissolving "Viron 290" in a mixed solvent of toluene/methyl ethyl ketone (weight ratio: 80/20)), "Viron 30SS" (one obtained by dissolving "Viron 300" in a mixed solvent of toluene/methyl ethyl ketone (weight ratio: 80/20)), and the like.

The thermoplastic polyester-based resin has preferably a glass transition temperature of 20° C. or lower, particularly preferably 15° C. or lower. When the glass transition temperature of the thermoplastic polyester-based resin exceeds 20° C., curling of the thermoplastic resin foam layer may sometimes occur owing to difference in contraction percentage at application of the thermoplastic polyester-based resin on the surface of the thermoplastic resin foam layer although it depends on the kind of the thermoplastic resin constituting the thermoplastic resin foam layer. When the temperature is 20° C. or lower, curling of the thermoplastic resin foam layer hardly occurs.

Incidentally, with regard to the glass transition temperature, a so-called "DSC curve" at re-elevation of temperature is determined by a measuring method using a differential scanning calorimeter (DSC) and an extrapolated glass transition temperature defined in JIS K 7121 can be determined as a glass transition temperature.

Such a thermoplastic polyester-based resin layer may have either structure of a structure in which a thermoplastic polyester-based resin is crosslinked and a structure in which the resin is not crosslinked. Therefore, the thermoplastic polyester-based resin layer can be formed using a crosslinking agent, according to the necessity. For example, at the time when the foamed member is used as a sealing material (e.g., a sealing material for electric or electronic devices or the like), when a stronger sealing property is desired, adhesiveness by the foam member can be enhanced by forming a thermoplastic polyester-based resin layer in the uncrosslinked form without using a crosslinking agent, and thus the foamed member can be utilized as a sealing material having a high functionality. To the contrary, when re-workability (re-peeling ability) such as easy recycling ability is desired, the re-workability of the foamed member can be enhanced by forming a thermoplastic polyester-based resin layer in the crosslinked form with using a crosslinking agent.

In the invention, the thermoplastic polyester-based resin layer preferably has a form (or structure) wherein the thermoplastic polyester-based resin is crosslinked by a crosslinking agent. When the thermoplastic polyester-based resin layer has the form wherein the thermoplastic polyester-based resin is crosslinked by a crosslinking agent as above, the attachment to the adherend (particularly, a resin plate) can be inhibited or prevented at the time when the foamed member is used in the form where the thermoplastic polyester-based resin layer is brought into contact with the adherend.

Moreover, for example, when the adhesiveness between the thermoplastic polyester-based resin layer and the carrier tape is high and the peeling ability of the foamed member from the carrier tape is not sufficiently obtained, a filler may be incorporated into the thermoplastic polyester-based resin layer. Thus, by incorporating the filler into the thermoplastic polyester-based resin layer, it becomes possible to lower contact area between the surface of the thermoplastic polyester-based resin layer of the foamed member and the pressure-sensitive adhesive surface of the carrier tape and also it becomes possible to enhance the peeling ability of the foamed member.

As above, into the thermoplastic polyester-based resin composition for forming the thermoplastic polyester-based resin layer, if necessary, known additives such as a crosslinking agent, a filler, a flame retardant, an antiaging agent, and an antistatic agent may be incorporated.

In this connection, the crosslinking agent is not particularly limited and examples thereof include isocyanate-based crosslinking agents, epoxy-based crosslinking agents, melamine-based crosslinking agents, aziridine-based crosslinking agents, oxazoline-based crosslinking agents, carbodiimide-based crosslinking agents, active methylol-based crosslinking agents, active alkoxymethyl-based crosslinking agents, metal chelete-based crosslinking agents, metal alkoxide-based crosslinking agents, metal salt-based crosslinking agents, peroxide-based crosslinking agents, urea-based crosslinking agents, amino-based crosslinking agents, coupling agent-based crosslinking agents (silane coupling agents, etc.), and the like. As the crosslinking agent, an isocyanate-based crosslinking agent or an epoxy-based crosslinking agent can be suitably used. The crosslinking agent may be used solely or in combination of two or more thereof.

Specifically, examples of the isocyanate-based crosslinking agents include aliphatic polyisocyanates (e.g., 1,4-tetramethylene diisocyanate, 1,6-hexamethylene diisocyanate, lysine diisocyanate, etc.), alicyclic polyisocyanates (e.g., cyclopentyl diisocyanate, cyclohexyl diisocyanate, isophorone diisocyanate, etc.), aromatic polyisocyanates (e.g., 2,4-tolylene diisocyanate, 4,4'-diphenylmethane diisocyanate, etc.), and aromatic aliphatic polyisocyanates (e.g., xylylene-1,4-diisocyanate, etc.) as well as dimers, trimers, reaction products or polymers of the above exemplified aliphatic polyisocyanates, alicyclic polyisocyanates, aromatic polyisocyanates, and aromatic aliphatic polyisocyanates [e.g., trimethylolpropane/tolylene diisocyanate trimer adducts (trade name "Colonate L" manufactured by Nippon Polyurethane Industry Co., Ltd.), trimethylolpropane/hexamethylene diisocyanate trimer adducts (trade name "Colonate HL" manufactured by Nippon Polyurethane Industry Co., Ltd., etc.), isocyanurates of hexamethylene diisocyanate (trade name "Colonate HX" manufactured by Nippon Polyurethane Industry Co., Ltd., etc.), and the like], polyether polyisocyanates, polyester polyisocyanates, and the like. Moreover, examples of the epoxy-based crosslinking agents include polyethylene glycol diglycidyl ether, polyglycerol polyglycidyl ether, glycerin diglycidyl ether, diglycidyl ether, trimethylolpropane triglycidyl ether, diglycidylaniline, N,N,N', N'-tetraglycidyl-m-xylenediamine (trade name "TETRAD-X" manufactured by Mitsubishi Gas Chemical Company Inc., etc.), 1,3-bis(N,N-glycidylaminomethyl)cyclohexane (trade name "TETRAD-C" manufactured by Mitsubishi Gas Chemical Company Inc., etc.), 1,6-hexanediol diglycidyl ether as well as various epoxy-based resins and the like. Furthermore, examples of the melamine-based crosslinking agents include hexamethylolmelamine and the like and examples of the aziridine-based crosslinking agents include trade name "HDU" (manufactured by Sogo Pharmaceutical Co., Ltd.), trade name "TAZM" (manufactured by Sogo Pharmaceutical Co., Ltd.), trade name "TAZO" (manufactured by Sogo Pharmaceutical Co., Ltd.), and the like.

The amount of the crosslinking agent to be used can be suitably selected depending on the kind of the thermoplastic polyester-based resin and, for example, is preferably from 0.01 to 15 parts by weight, particularly from 0.1 to 10 parts by weight relative to 100 parts by weight of the thermoplastic polyester-based resin. When the content of the crosslinking agent is less than 0.01 part by weight relative to 100 parts by weight of the thermoplastic polyester-based resin, formation of crosslinkage with the crosslinking agent is insufficient and cohesive force of the thermoplastic polyester-based resin decreases, so that the foamed member cannot exhibit sufficient re-workability in some cases. On the other hand, when the content exceeds 15 parts by weight, the cohesive force of the thermoplastic polyester-based resin layer increases and the resin layer gets hard, so that the sealing ability of the foamed member sometimes decreases.

The filler is not particularly limited and can be suitably selected from among known fillers and used. The filler can be used solely or in combination of two or more thereof. In the invention, as the filler, powder particles can be suitably used. As such powder particles, for example, powdery particles having an average particle diameter (particle size) of about 0.1 to 10 μm can be used. Examples of the powder particles include powdery talc, silica, alumina, zeolite, calcium carbonate, magnesium carbonate, barium sulfate, zinc oxide, titanium oxide, aluminum hydroxide, magnesium hydroxide, mica, clay such as montmorillonite, carbon particles, glass fibers, carbon tubes, and the like. In this connection, as the filler, a flame retardant can be also used. As the flame retardant, an inorganic flame retardant is preferred. As the inorganic flame retardant, for example, a chlorine-based flame retardant, a bromine-based flame retardant, a phosphorus-based flame retardant, an antimony-based flame retardant, or the like may be used. However, since the chlorine-based flame retardant and bromine-based flame retardant generate gas components harmful to human bodies at combustion and corrosive to devices and the phosphorus-based flame retardant and antimony-based flame retardant have problems of harmfulness and explosive nature, a non-halogen and non-antimony inorganic flame retardant can be suitably used.

Examples of the non-halogen and non-antimony inorganic flame retardant include hydrated metal compounds such as aluminum hydroxide, magnesium hydroxide, hydrates of magnesium oxide/nickel oxide, and hydrates of magnesium oxide/zinc oxide, and the like. In this connection, the hydrated metal compounds may be surface-treated.

The thermoplastic polyester-based resin layer can be formed by applying a thermoplastic polyester-based resin composition containing a thermoplastic polyester-based resin and optional additives such as a crosslinking agent and a filler, on a prescribed surface and performing drying and curing, according to the necessity.

Incidentally, at the time when the thermoplastic polyester-based resin layer is formed by applying the thermoplastic polyester-based resin or a composition thereof, the amount of the thermoplastic polyester-based resin or the composition thereof to be applied (solid content or dry weight) is not particularly limited and can be suitably selected from the range of 1 to 25 $g/m^2$, preferably 5 to 20 $g/m^2$.

(Thermoplastic Elastomer Resin Layer)

The thermoplastic elastomer resin layer is not particularly limited so long as it is a layer formed of a thermoplastic elastomer resin. The thermoplastic elastomer resin constituting the thermoplastic elastomer resin layer can be suitably selected from among known thermoplastic elastomer resins. The thermoplastic elastomer resin is generally constituted by a hard segment part and a soft segment part. Specifically, for example, when the thermoplastic elastomer resin is a styrene-isoprene-styrene-based thermoplastic elastomer resin, the repeating units (monomer units or constitutional units) of the styrene components in the styrene-isoprene-styrene-based thermoplastic elastomer resin correspond to the hard segment part and the repeating unit of the isoprene component corresponds to the soft segment part. In the invention, the ratio of the hard segment part and the soft segment part in the thermoplastic elastomer resin is not particularly limited but the content ratio of the hard segment part in the thermoplastic elastomer resin is preferably less than 50% by mol and is particularly suitably less than 30% by mol. By using a thermoplastic elastomer resin having a content ratio of the hard segment part of less than 50% by mol as the thermoplastic elastomer resin, adverse effects on elongation and flexibility of the thermoplastic resin foam layer in the foamed member can be effectively inhibited or prevented.

Specifically, examples of the thermoplastic elastomer resin include styrene-based thermoplastic elastomer resins, olefinic thermoplastic elastomer resins, polyester-based thermoplastic elastomer resins, polyamide-based thermoplastic elastomer resins, urethane-based thermoplastic elastomer resins, vinyl chloride-based thermoplastic elastomer resins, diene-based thermoplastic elastomer resins, and the like. As the thermoplastic elastomer resin, particularly, a styrene-based thermoplastic elastomer resin can be suitably used. The thermoplastic elastomer resin can be used solely or in combination of two or more thereof.

Examples of the above styrene thermoplastic elastomer resin include styrene-isoprene-styrene-based thermoplastic elastomer resins (SIS-based thermoplastic elastomer resins), styrene-butadiene-styrene-based thermoplastic elastomer resins (SBS-based thermoplastic elastomer resins), styrene-ethylene-butene-styrene-based thermoplastic elastomer resins (SEBS-based thermoplastic elastomer resins), styrene-ethylene-propylene-styrene-based thermoplastic elastomer resins (SEPS-based thermoplastic elastomer resins), and the like. As the styrene-based thermoplastic elastomer resin, particularly SIS-based thermoplastic elastomer resin is suitable.

In the invention, as the thermoplastic elastomer resin, for example, a series of trade name "SIS" [e.g., trade name "SIS 5405" (SIS-based thermoplastic elastomer resin; content ratio of styrene components: 18% by mol), trade name "SIS 5002" (SIS-based thermoplastic elastomer resin; content ratio of styrene components: 22% by mol)] and a series of trade name "Septon" [e.g., trade name "Septon 2104" (SIS-based thermoplastic elastomer resin; content ratio of styrene components: 65% by mol) are suitably used. In this connection, the content ratio of the styrene components in the SIS-based thermoplastic elastomer resin means a ratio (% by mol) of the repeating units of the styrene components relative to the total repeating units in the SIS-based thermoplastic elastomer resin.

Into the thermoplastic elastomer resin composition for forming the thermoplastic elastomer resin layer, known additives (e.g., a filler, a flame retardant, an antiaging agent, an antistatic agent, a crosslinking agent, etc.) may be optionally incorporated.

The thermoplastic elastomer resin layer can be formed by applying a thermoplastic elastomer resin composition containing a thermoplastic elastomer resin and optional various additives, on a predetermined surface and performing drying and curing, according to the necessity.

Incidentally, at the time when the thermoplastic elastomer resin layer is formed by applying the thermoplastic elastomer resin or a composition thereof, the amount of the thermoplastic elastomer resin or the composition thereof to be applied (solid content or dry weight) is not particularly limited and can be suitably selected from the range of 1 to 25 g/m$^2$, preferably 5 to 20 g/m$^2$ as in the case of the thermoplastic polyester-based resin or the composition thereof.

(Thermoplastic Resin Foam Layer)

The thermoplastic resin foam layer is constituted by a thermoplastic resin foam formed through a step of impregnating a high-pressure inert gas into a thermoplastic resin and subsequently reducing pressure. Incidentally, in a physical foaming method (a foaming method by a physical method), anxiety is expressed on flammability, toxicity, and influence on the environment such as ozone layer destruction of the substance used as the foaming agent. However, a foaming method using an inert gas is an environment-friendly method in view of no use of such a foaming agent. Moreover, in a chemical foaming method (a foaming method by a chemical method), since residue of a foaming gas remains in the foam, contamination with a corrosive gas and impurity in the gas may become a problematic particularly in electronic device applications where a low contamination is highly required. However, in the foaming method using an inert gas, a clean foam without contamination of such impurities can be obtained. Furthermore, in the physical foaming method and the chemical foaming method, it is recognized that it is difficult to form a fine cell structure in both cases and particularly, it is extremely difficult to form fine cells having 300 μm or less.

As above, in the invention, after a high-pressure inert gas is impregnated into a thermoplastic resin, a thermoplastic resin foam is formed through a step of reducing pressure and the thermoplastic resin foam is used as the thermoplastic resin foam layer. In this connection, for the impregnation of the inert gas, the inert gas may be impregnated into an unfoamed molded product molded beforehand or the inert gas may be impregnated into a melted thermoplastic resin (melted polymer) under a pressurized state. Therefore, specifically, as a method of forming the thermoplastic resin foam, a method of impregnating a high-pressure inert gas into a thermoplastic resin and subsequently forming the foam through a step of reducing pressure; a method of impregnating a high-pressure inert gas into an unfoamed molded product composed of the thermoplastic resin and subsequently forming the foam through a step of reducing pressure; or a method of impregnating a high-pressure inert gas into a melted thermoplastic resin in a pressurized state and subsequently forming the foam by subjecting the resin to pressure reduction and molding are preferred.

In the invention, the thermoplastic resin (thermoplastic polymer) as a material for the foam (resin foam) is not particularly limited so long as it is a polymer showing thermoplasticity and capable of impregnation of a high-pressure gas. Examples of such a thermoplastic resin include polyolefinic resins such as low-density polyethylene, medium-density polyethylene, high-density polyethylene, linear low-density polyethylene, polypropylene, copolymers of ethylene with propylene, copolymers of ethylene or propylene with other α-olefin(s) (e.g., butene-1, pentene-1, hexene-1,4-methyl-pentene-1, etc.), copolymers of ethylene with other ethylenically unsaturated monomer(s) (e.g., vinyl acetate, acrylic acid, an acrylate ester, methacrylic acid, a methacrylate ester, vinyl alcohol, etc.); styrene-based resins such as polystyrene, an acrylonitrile-butadiene-styrene copolymer (ABS resin); polyamide-based resins such as 6-nylon, 66-nylon, and 12-nylon; polyamideimides; polyurethanes; polyimides; polyetherimides; acrylic resins such as polymethyl methacrylate; polyvinyl chloride; polyvinyl fluoride; alkenyl aromatic resins; polyester-based resins such as polyethylene terephthalate and polybutylene terephthalate; polycarbonates such as bisphenol A-based polycarbonate; polyacetals; polyphenylene sulfides; and the like. The thermoplastic resin can be used solely or in combination of two or more thereof. In this connection, when the thermoplastic resin is a copolymer, it may be either type of copolymers of a random copolymer and a block copolymer.

As the thermoplastic resin, a polyolefinic resin can be suitably used. As the polyolefinic resin, it is preferred to use a resin having a wide molecular weight distribution and a shoulder at a high molecular-weight side, a resin of a little crosslinked type (a resin of slightly crosslinked type), a resin of a long-chain branched type, or the like.

In the invention, it is preferred to use a rubber component and/or a thermoplastic elastomer component together with the thermoplastic resin. The ratio of the rubber component and/or thermoplastic elastomer component is not particularly limited. The mixing ratio (% by weight) of the polyolefinic resin as the thermoplastic resin and the rubber component and/or thermoplastic elastomer component in the mixture may be, for example: former/latter=1/99 to 99/1, preferably 10/90 to 90/10, more preferably 20/80 to 80/20. In the mixture of the thermoplastic resin and the rubber component and/or thermoplastic elastomer component, when the ratio of the rubber component and/or thermoplastic elastomer component is less than 1% by weight, the cushioning property of the thermoplastic resin foam tends to decrease. On the other hand, when the ratio exceeds 99% by weight, the gas tends to leak out at foaming and thus it becomes difficult to obtain a highly expanded foam.

The rubber component or thermoplastic elastomer component is not particularly limited so long as it has rubber elasticity and is capable of foaming. Examples thereof include natural or synthetic rubbers such as natural rubber, polyisobutylene, polyisoprene, chloroprene rubber, butyl-rubber, and nitrile rubber; and various thermoplastic elastomers, e.g., olefinic elastomers such as ethylene-propylene copolymers, ethylene-propylene-diene copolymers, ethylene-vinyl acetate copolymers, polybutene, and chlorinated polyethylene; styrene-based elastomers such as styrene-butadiene-styrene copolymers, styrene-isoprene-styrene copolymers and hydrogenation products thereof, polyester-based elastomers; polyamide-based elastomers; polyurethane-based elastomers; and the like. These rubber components and/or thermoplastic elastomer components can be used solely or in combination of two or more thereof. Since these rubber components and/or thermoplastic elastomer components have, for example, a glass transition temperature of room temperature or lower, e.g., 20° C. or lower, they are remarkably excellent in flexibility and shape-following ability when they are used as a dust-proof material or a sealing material.

As the rubber component and/or thermoplastic elastomer component to be used together with the thermoplastic resin, an olefinic elastomer can be suitably used. The olefinic elastomer usually has a structure where the olefinic resin component and ethylene-propylene rubber are present in a microphase separation state and thus is good in compatibility with the polyolefinic resin to be used as the thermoplastic resin.

In the invention, the thermoplastic resin foam (or the thermoplastic resin foam layer) preferably further contains powder particles. The powder particles can exhibit a function as a foaming nucleus agent at foam formation. Therefore, by incorporating the powder particles, a thermoplastic resin foam in a good foamed state can be obtained. Examples of the powder particles include powdery talc, silica, alumina, zeolite, calcium carbonate, magnesium carbonate, barium sulfate, zinc oxide, titanium oxide, aluminum hydroxide, magnesium hydroxide, mica, clay such as montmorillonite, carbon particles, glass fibers, carbon tubes, and the like. The powder particles can be used solely or in combination of two or more thereof.

Incidentally, in the invention, as the powder particles, powdery particles having an average particle diameter (particle size) of about 0.1 to 20 μm can be suitably used. When the average particle diameter is less than 0.1 μm, the particles may not sufficiently function as a nucleus agent in some cases. When the particle size exceeds 20 μm, the particles may sometimes cause gas leakage at foam formation and thus the case is not preferred.

The amount of the powder particles to be incorporated is not particularly limited but can be, for example, suitably selected from the range of 0.1 to 150 parts by weight, preferably 1 to 130 parts by weight, more preferably 2 to 50 parts by weight relative to 100 parts by weight of total weight of the thermoplastic resin and the rubber component and/or thermoplastic elastomer component. When the amount of the powder particles to be incorporated is less than 0.1 part by weight relative to 100 parts by weight of the thermoplastic resin, it becomes difficult to obtain a homogeneous foam. On the other hand, when the amount exceeds 150 parts by weight, the viscosity as the foam structure composition (composition for thermoplastic resin foam) remarkably increases and also gas leakage may possibly occur at foam formation to impair foaming properties.

Moreover, since the thermoplastic resin foam is constituted by the thermoplastic resin, it has a property of easy flammability (of course, it is also a disadvantage). Therefore, in particular, it is preferred to incorporate powder particles (e.g., various powdery flame retardants, etc.) having flame retardancy as the powder particles into the foam member in the applications such as applications of electrical and electronic devices where impartment of flame retardancy is indispensable. In this connection, the flame retardant can be used together with powder particles other than the flame retardant.

In the invention, in the powdery flame retardant, an inorganic flame retardant is suitable as a flame retardant. As the inorganic flame retardant, for example, a bromine-based flame retardant, a chlorine-based flame retardant, a phosphorus-based flame retardant, an antimony-based flame retardant, or the like may be used. However, since the chlorine-based flame retardant and bromine-based flame retardant generate gas components harmful to human bodies and corrosive to devices at combustion and the phosphorus-based flame retardant and antimony-based flame retardant have problems of harmfulness and explosive nature, a non-halogen and non-antimony inorganic flame retardant can be suitably used. Examples of the non-halogen and non-antimony inorganic flame retardant include hydrated metal compounds such as aluminum hydroxide, magnesium hydroxide, hydrates of magnesium oxide/nickel oxide, and hydrates of magnesium oxide/zinc oxide, and the like. In this connection, the hydrated metal compounds may be surface-treated. The flame retardant can be used solely or in combination of two or more thereof.

In the case of using a flame retardant, the amount of the flame retardant to be used is not particularly limited and can be, for example, suitably selected from the range of 10 to 70% by weight, preferably 25 to 65% by weight relative to the total amount of the foam structure composition (composition for thermoplastic resin foam). When the amount of the flame retardant to be used is too small, the effect of flame retardant is small. To the contrary, when the amount is too large, it becomes difficult to obtain a highly expanded foam.

Various additives may be optionally incorporated into the foam structure composition (composition for thermoplastic resin foam). The kinds of the additives to be added according to the necessity are not particularly limited and various additives usually used for foam formation can be employed. Specifically, examples of the additives include a foam nucleus agent, a crystal nucleus agent, a plasticizer, a lubricant, a colorant (pigment, dye, or the like), a UV absorber, an antioxidant, an antiaging agent, a filler, a reinforcing agent, an antistatic agent, a surfactant, a tension-modifying agent, a shrinkage-preventing agent, a fluidity-modifying agent, clay, a vulcanizing agent, a surface-treating agent, a flame retardant in any form other than a powder form, and the like. The amount of the additive(s) to be added may be suitably selected from among the range where foam formation is not impaired and an amount used at usual formation of a thermoplastic resin can be adopted.

Moreover, the inert gas to be used at the formation of the thermoplastic resin foam is not particularly limited so long as it is inert to the thermoplastic resin and is capable of impregnation. Examples thereof include carbon dioxide, nitrogen gas, air, and the like. These gases may be used as a mixture. Of these, in view of large amount of impregnation and rapid impregnation rate into the thermoplastic resin to be used as a material for the foam, carbon dioxide can be suitably used.

Furthermore, from the viewpoint of acceleration of impregnation rate into the thermoplastic resin, the above high-pressure inert gas (particularly, carbon dioxide) is preferably in a supercritical state. In the supercritical state, solubility of the gas in the thermoplastic resin increases and thus mixing at a high concentration is possible. Moreover, at rapid pressure drop after impregnation, since high-concentration impregnation is possible as mentioned above, generation of foam nuclei increases and density of the bubbles which are formed through growth of the foam nuclei increases even when porosity is identical, so that fine cells can be obtained. In this connection, critical temperature and critical pressure of carbon dioxide are 31° C. and 7.4 MPa, respectively.

At the time when the foam is produced by impregnating a high-pressure inert gas into the thermoplastic resin, the production may be carried out by a batch method wherein a composition for thermoplastic resin foam is beforehand molded into a suitable form such as a sheet form to form an unfoamed resin molded product (unfoamed molded product), then the high-pressure inert gas is impregnated into the unfoamed resin molded product, and pressure is released to effect foaming. Alternatively, the production may be carried out by a continuous method wherein the composition for resin foam is kneaded with the high-pressure inert gas under an elevated pressure and pressure is released simultaneously with the molding, thereby the molding and foaming being carried out at the same time. As above, the inert gas may be impregnated into the unfoamed resin molded product molded beforehand or the inert gas may be impregnated into the melted thermoplastic resin under an elevated pressure and then the resin may be subjected to molding at the time when pressure is reduced.

Specifically, at the time when the thermoplastic resin foam is produced by the batch method, examples of the process for producing the unfoamed resin molded product include a method of molding a composition for thermoplastic resin foam (composition for foam structure) containing a thermoplastic resin, an optional rubber component and/or an optional thermoplastic elastomer component, and optional powder particles and the other additive(s) by means of an extruder such as a single-screw extruder or a twin-screw extruder; a method of homogeneously kneading the same composition for thermoplastic resin foam as above by means of a kneader provided with blades, such as roller, cum, kneader, or Banbury type and press-molding the composition into a predetermined thickness using a hot-plate press; and a method of molding by means of an injection molding machine, and the like method. The molding may be performed by a suitable method capable of affording a molded product having desired shape and thickness. Cells are formed in the thermoplastic resin through a gas impregnation step where thus obtained unfoamed resin molded product (molded product of a composition for thermoplastic resin foam) is placed in a pressure vessel (high-pressure vessel) and a high-pressure inert gas (carbon dioxide or the like) is injected (introduced) to impregnate the high-pressure inert gas into the unfoamed resin molded product, a pressure-reducing step where pressure is released (usually, up to atmospheric pressure) at the time when the high-pressure inert gas is sufficiently impregnated to generate cell nuclei in the thermoplastic resin, and optionally (if necessary) a heating step where the cell nuclei are grown by heating. The cell nuclei may be grown at room temperature without performing the heating step. After the cells are grown as above, if necessary, by rapid cooling with cold water to fix the shape, the thermoplastic resin foam can be obtained. In this connection, shape of the unfoamed resin molded product is not particularly limited and may be any of a roll shape, a plate shape, and the like. Moreover, the introduction of the high-pressure inert gas may be carried out continuously or discontinuously. In addition, as the heating method at the growth of the cell nuclei, known or conventional means such as water bath, oil bath, hot roll, hot-air oven, far-infrared irradiation, near-infrared irradiation, microwave irradiation, and the like can be adopted. Furthermore, as the unfoamed resin molded product (unfoamed molded product) to be subjected to foaming is not limited to sheet shape one and variously shaped ones such as a square pillar can be used. The unfoamed resin molded product to be subjected to foaming can be also prepared by the other molding methods other than extrusion molding, press molding and injection molding.

On the other hand, in the case where the thermoplastic resin foam is produced by the continuous method, the foam can be produced through a kneading and impregnation step where a high-pressure inert gas (carbon dioxide or the like) is injected (introduced) to sufficiently impregnate the high-pressure inert gas into a thermoplastic resin while kneading a composition for thermoplastic resin foam (composition for foam structure) containing the thermoplastic resin, an optional rubber component and/or an optional thermoplastic elastomer component, and optional powder particles and the other additive(s) by means of an extruder such as a single-screw extruder or a twin-screw extruder and a molding and pressure-reducing step where pressure is released (usually, up to atmospheric pressure) by extruding the composition for thermoplastic resin foam through a die provided at the end of the extruder to perform molding and foaming at the same time. Moreover, optionally (if necessary), there may be included a heating step where the cell nuclei are grown by heating. After the cells are grown as above, if necessary, by rapid cooling with cold water to fix the shape, the thermoplastic resin foam can be obtained. The above kneading and impregnation step and molding and pressure-reducing step can be carried out using an injection molding machine or the like other than the extruder. Moreover, a method capable of affording a thermoplastic resin foam having a sheet shape, a square pillar shape or any other shape may be suitably selected.

The amount of the high-pressure inert gas to be mixed is not particularly limited and is, for example, about from 2 to 10% by weight relative to the total amount of the thermoplastic resin component. It may be mixed with suitable regulation so that desired density and expansion ratio are obtained.

In the gas impregnation step in the batch method and in the kneading and impregnation step in the continuous method, the pressure at the time when the high-pressure inert gas is impregnated into the unfoamed resin molding or the composition for thermoplastic resin foam may be suitably selected in consideration of the kind of the inert gas, operability, and the like and may be, for example, 6 MPa or more (e.g., about from 6 to 100 MPa), preferably 8 MPa or more (e.g., about from 8 to 100 MPa). When the pressure of the inert gas is lower than 6 MPa, cell growth is remarkable at foaming and cell diameter becomes too large, so that inconveniences such as a lowered dust-proof effect tends to occur and thus the case is not preferred. This is because the impregnated amount of the inert gas under low pressure is relatively small as compared with the amount under high pressure and cell nucleus-forming rate may be lowered to decrease the number of cell nuclei formed, so that the amount of the gas per cell contrary increases and thus cell diameter becomes extremely large. Moreover, in the pressure region of lower than 6 MPa, cell diameter and cell density remarkably change by changing filtration pressure only a little, so that control of the cell diameter and cell density tends to become difficult.

Moreover, in the gas impregnation step in the batch method and in the kneading and impregnation step in the continuous method, the temperature at the time when the high-pressure inert gas is impregnated into the unfoamed resin molded product or the composition for thermoplastic resin foam varies depending on the kind of the high-pressure inert gas and the thermoplastic resin and can be selected from a wide range. In consideration of operability and the like, the temperature may be about from 10 to 350° C. For example, in the batch method, the impregnation temperature in the case of impregnating the high-pressure inert gas into a sheet-shape unfoamed resin molded product is about 10 to 200° C., preferably 40 to 200° C. Moreover, in the continuous method, the temperature at the time when the high-pressure inert gas is injected into the thermoplastic resin composition (composition for thermoplastic resin foam) is generally about from 60 to 350° C. In the case where carbon dioxide is used as the high-pressure inert gas, the temperature at the impregnation (impregnation temperature) is preferably 32° C. or higher, particularly 40° C. or higher in order to keep a supercritical state.

In the above pressure-reducing step, the pressure-reducing rate is not particularly limited but is preferably about from 5 to 300 MPa/second for obtaining homogeneous fine cells. Moreover, the heating temperature in the above heating step is, for example, about 40 to 250° C., preferably 60 to 250° C.

Furthermore, according to such a process for producing the thermoplastic resin foam, a thermoplastic resin foam having a high expansion ratio can be produced, so that the process has an advantage that a thick thermoplastic resin foam can be produced. For example, in the case where the thermoplastic resin foam is produced by the continuous method, it is necessary to narrow the gap of the die to be fitted to the end of the extruder as far as possible (usually 0.1 to 1.0 mm) in order to keep the pressure of the inside of the extruder in the kneading and impregnation step. Therefore, in order to obtain the thick thermoplastic resin foam, the composition of the thermoplastic resin foam extruded through the narrow gap should be foamed at a high expansion ratio. However, hitherto, since the high expansion ratio is not obtained, the thickness of the foam formed is limited to thin (e.g., about from 0.5 to 2.0 mm). To the contrary, in the case of the thermoplastic resin foam produced using the high-pressure inert gas, it is possible to continuously obtain a foam having a final thickness of 0.50 to 5.00 mm. In this connection, in order to obtain such a thick thermoplastic resin foam, the relative density of the thermoplastic resin foam (density after foaming/density in an unfoamed state) is desirably from 0.02 to 0.3, preferably from 0.05 to 0.25. When the above relative density exceeds 0.3, foaming is insufficient, and when the density is less than 0.02, the strength of the foam sometimes decreases, so that the cases are not preferred.

In the invention, the apparent density of the thermoplastic resin foam (or a thermoplastic resin foam layer) may be suitably set depending on the intended purpose but is preferably 0.2 g/cm$^3$ or less, more preferably 0.15 g/cm$^3$ or less, further preferably 0.13 g/cm$^3$ or less. A lower limit of the apparent density of the thermoplastic resin foam (or a thermoplastic resin foam layer) is preferably 0.02 g/cm$^3$ or more, more preferably 0.03 g/cm$^3$ or more. The apparent density of the thermoplastic resin foam (or a thermoplastic resin foam layer) can be controlled by regulating the expansion ratio by the amount and pressure of the inert gas to be impregnated. Moreover, through the regulation of the expansion ratio or the like, foamed structures such as an independent cell structure, a continuous cell structure, a mixed cell structure containing these structures can be controlled. When the apparent density of the thermoplastic resin foam (or a thermoplastic resin foam layer) exceeds 0.20 g/cm$^3$, foaming becomes insufficient. On the other hand, when the density is less than 0.02 g/cm$^3$, the strength of the thermoplastic resin foam (or a thermoplastic resin foam layer) sometimes remarkably decreases, so that the case is not preferred.

Incidentally, with regard to the apparent density of the thermoplastic resin foam (or a thermoplastic resin foam layer), the thermoplastic resin foam is punched out by means of a punching tooth of 40 mm×40 mm and the size of the punched sample is measured. Also, the thickness is measured by means of a $\frac{1}{100}$ dial gauge having a diameter ($\phi$) of a measuring terminal of 20 mm. A volume of the thermoplastic resin foam is calculated from these values. Then, the weight of the thermoplastic resin foam is measured by means of an even balance having a minimum scale of 0.01 g or more. From these values, the apparent density (g/cm$^3$) of the thermoplastic resin foam is calculated.

The thickness, relative density, and apparent density of the thermoplastic resin foam (or a thermoplastic resin foam layer) can be adjusted by suitably selecting and setting the operation conditions such as the temperature, pressure, and time in the gas impregnation step and kneading and filtration step, the operation conditions such as the pressure-reducing rate, temperature and pressure in the pressure-reducing step and molding pressure-reducing step, and the heating temperature in the heating step after pressure-reduction or after molding pressure-reduction depending on the kinds of the inert gas, the thermoplastic resin, and the rubber components and/or the thermoplastic elastomer component.

In this connection, in such a thermoplastic resin foam (or a thermoplastic resin foam layer), as the cell structure, an independent cell structure and a semi-continuous semi-independent cell structure (it is a mixed cell structure wherein the independent cell structure and the continuous cell structure are present and the ratio is not particularly limited) are preferred and particularly, a cell structure containing 80% or more, particularly 90% or more of the independent cell structure portion in the thermoplastic resin foam is suitable.

The shape and thickness of the foam member of the invention are not particularly limited and can be suitably selected depending on the intended purposes. For example, the thickness of the foamed member can be selected from the range of about 0.5 to 5 mm, preferably about 0.8 to 3 mm.

Moreover, the foamed member is usually processed into various shapes according to the apparatus to be used and then commercialized. On this occasion, the foamed member can be processed and conveyed in a state where the foamed member is adhered to a carrier tape (i.e., the foamed member is supported by the carrier tape to be as a foamed member laminate).

Foamed Member Laminate

The foamed member laminate of the invention has a constitution in which a foamed member is supported by a carrier tape. The above-mentioned foamed member is used as the foamed member and the laminate has a constitution in which the foamed member is adhered to the carrier tape in such a way that a surface of the thermoplastic polyester-based resin layer or the thermoplastic elastomer resin layer of the foamed member is brought into contact with the pressure-sensitive adhesive surface of the carrier tape. Accordingly, since the foamed member laminate has a constitution in which the foamed member is adhered to the pressure-sensitive adhesive surface of the carrier tape, the foamed member can be processed and conveyed in a state where the foamed member is adhered on the pressure-sensitive adhesive surface of the carrier tape. Further, since the surface of the thermoplastic polyester-based resin layer or the thermoplastic elastomer resin layer of the foamed member is adhered to the pressure-sensitive adhesive surface of the carrier tape, the foamed member can be easily peeled from the carrier tape with inhibition or prevention of foam breakage, at the time when the foamed member is used.

The above-mentioned carrier tape is not particularly limited but it is important to have a pressure-sensitive adhesive surface. In this connection, it is important for the carrier tape to exhibit a pressure-sensitive adhesive strength (adhesive strength) sufficient to support the foamed member at the processing and conveyance of the foamed member and, on the other hand, exhibit such a pressure-sensitive adhesive strength (adhesive strength) that the foamed member can be easily peeled without breaking the surface of the foamed member at the peeling of the foamed member.

Therefore, as the carrier tape, a pressure-sensitive adhesive tape or sheet having a pressure-sensitive adhesive layer of any of various pressure-sensitive adhesives can be used. Particularly, from the viewpoint of achieving both of adhesiveness and peeling ability with the foamed member, an acrylic pressure-sensitive adhesive tape or sheet having an acrylic pressure-sensitive adhesive layer of an acrylic pressure-sensitive adhesive containing a (meth)acrylic alkyl ester as a main component of the pressure-sensitive adhesive can be suitably used. Such a pressure-sensitive adhesive tape or sheet may have either constitution, i.e., a pressure-sensitive adhesive tape or sheet with a substrate having a constitution wherein a pressure-sensitive adhesive layer is formed on at least one side of the substrate or a substrate-less pressure-sensitive adhesive tape or sheet having a constitution wherein it is formed of a pressure-sensitive adhesive layer alone.

In the pressure-sensitive adhesive forming the pressure-sensitive adhesive layer, examples of the pressure-sensitive adhesive other than the acrylic pressure-sensitive adhesive include rubber-based pressure-sensitive adhesives (natural rubber-based pressure-sensitive adhesives, synthetic rubber-based pressure-sensitive adhesives, etc.), silicone-based pressure-sensitive adhesives, polyester-based pressure-sensitive adhesives, urethane-based pressure-sensitive adhesives, polyamide-based pressure-sensitive adhesives, epoxy-based pressure-sensitive adhesives, vinyl alkyl ether-based pressure-sensitive adhesives, fluorine-based pressure-sensitive adhesives, and the like. Moreover, the pressure-sensitive adhesive may be a hot melt type pressure-sensitive adhesive. The pressure-sensitive adhesive may be used solely or in combination of two or more thereof. The pressure-sensitive adhesive may be any form of pressure-sensitive adhesives such as emulsion-based pressure-sensitive adhesives, solvent-based pressure-sensitive adhesives, oligomer-based pressure-sensitive adhesives, and solid pressure-sensitive adhesives.

Moreover, the substrate in the pressure-sensitive adhesive tape or sheet is not particularly limited and, for example, there may be used plastic substrates such as plastic films and sheets; paper-based substrates such as paper; fibrous substrates such as fabrics, non-woven fabrics, and nets; metallic substrate such as metal foils and metal plates; rubber-based substrates such as rubber sheets; suitable thin materials such as foams including foamed sheets and laminates thereof (particularly, laminates of plastic substrates with other substrates, laminates of plastic films (or sheets) themselves, etc.).

In this connection, the thickness and the like of the substrate and the pressure-sensitive adhesive layer in the pressure-sensitive adhesive tape or sheet as the carrier tape are not particularly limited.

After the foamed member is subjected to processing so as to form a predetermined shape using the foamed member laminate of the invention, the foamed member can be isolated by peeling the foamed member from the carrier tape. The foamed member thus isolated is peeled through peeling at the interface between the foamed member and the carrier tape, keeps a good foam structure with hardly any or no occurrence of foam breakage where breakage occurs in the foam of the foamed member, and is processed into a predetermined shape. Therefore, the foamed member processed and isolated using the foamed member laminate is useful as a dust-proof material to be used at the time when various members or parts are mounted (installed) to predetermined sites. In particular, the foamed member can be suitably used also at the time when a small-size members or parts are installed to thin-model products.

The various members or parts capable of being mounted (installed) utilizing the foamed member are not particularly limited but examples thereof include various members or parts in electric or electronic devices. Examples of such members or parts for electric or electronic devices include image-displaying members (particularly, small-size image-displaying members) to be installed to image-displaying devices such as liquid crystal displays, electroluminescence displays, and plasma displays and optical members or optical parts such as cameras and lenses (particularly, small-size cameras and lenses) to be installed to mobile communication devices such as so-called "mobile phones" and "handheld terminals".

Moreover, the foamed members can be also used as a dust-proof material for preventing leakage of tanner from a toner cartridge. Thus, as the toner cartridge capable of being mounted utilizing the foamed member, there may be mentioned toner cartridges and the like to be used in image-forming devices such as copying machines and printers.

Electric or Electronic Devices

The electric or electronic device of the invention has a constitution in which a foamed member is used, and the above-mentioned foamed member is used as a foamed member. In the electric or electronic devices, the foamed member is, for example, used as a dust-proof material (sealing material). Such an electric or electronic device has a constitution in which a member or part for the electric or electronic device is mounted (installed) to a predetermined site through the foamed member. Specifically, as the electric or electronic devices, there may be mentioned electric or electronic devices (e.g, mobile communication devices such as so-called "mobile phones" and "handheld terminals") having a constitution that image-displaying devices (particularly, image-displaying devices in which small-size image-displaying members are installed as optical members) such as liquid crystal displays, electroluminescence displays, and plasma displays and cameras and lenses (particularly, small-size cameras and lenses) as optical members or optical parts are installed through the foamed member. Such electric or electronic devices may be products thinner than conventional ones, and thickness, shape, and the like thereof are not particularly limited.

In this connection, it is sufficient that the foamed member has a constitution that a thermoplastic polyester-based resin layer and/or a thermoplastic elastomer resin layer is/are formed on at least one side (one side or both sides) of the thermoplastic resin foam layer. However, the member may have a constitution that a thermoplastic polyester-based resin layer and/or a thermoplastic elastomer resin layer is/are formed on one side of the thermoplastic resin foam layer and another layer, a substrate (e.g., a pressure-sensitive adhesive layer), or the like is formed on the other side of the thermoplastic resin foam layer.

EXAMPLES

The following will specifically explain the present invention with reference to Examples but the invention is not limited to these Examples.

Production Example 1 of Foam

Forty-five parts by weight of Polypropylene [melt flow rate (MFR): 0.35 g/10 min], 55 parts by weight of a polyolefin elastomer (MFR: 6 g/10 min; JIS A hardness of 79°), and 120 parts by weight of magnesium hydroxide (average particle diameter: 0.7 μm) as a powdery flame retardant were kneaded at a temperature of 200° C. in a twin-screw kneader manufactured by Japan Steel Works, Ltd. (JSW), and then extruded into a strand shape. After water-cooling, the strand was cut into pellets, thus forming being effected. The pellets were charged into a single-screw extruder manufactured by Japan Steel Works, Ltd. and carbon dioxide gas was injected under a pressure of 22 MPa/cm$^2$ (19 MPa/cm$^2$ after injection) in an atmosphere of 220° C. After sufficiently saturated with carbon dioxide gas, the whole was cooled to a temperature suitable for foaming and then extruded from a die to obtain a foam (foamed structure). The foam had an apparent density of 0.12 g/cm$^3$ and a thickness of 1.5 mm. Then, the foam was sliced to obtain a foam (sometimes referred to as "foamed structure A") having a thickness of 0.5 mm.

Example 1

A mixed solvent of toluene/methyl ethyl ketone (weight ratio: former/latter=80/20) was added to a thermoplastic polyester-based resin (trade name "Viron 29SS" manufactured by Toyobo Co., Ltd.; glass transition temperature: 64° C., solid matter concentration: 30% by weight) to dilute the solid matter concentration to 25% by weight and the resulting one was applied onto one surface of the foamed structure A in an application amount of 6 g/m$^2$ as dry weight (solid matter weight). Thereafter, the whole was heated to 110° C. for 3 minutes and dried to form a thermoplastic polyester-based resin layer (coat layer) on the surface of the foamed structure, thereby a foamed member being obtained.

Example 2

A foamed member was obtained in the same manner as in Example 1 except that a mixed solvent of toluene/methyl ethyl ketone (weight ratio: former/latter=80/20) was added to a thermoplastic polyester-based resin (trade name "Viron 29SS" manufactured by Toyobo Co., Ltd.; glass transition temperature: 64° C., solid matter concentration: 30% by weight) to dilute the solid matter concentration to 25% by weight and the resulting one was applied onto one surface of the foamed structure A in an application amount of 10 g/m$^2$ as dry weight (solid matter weight).

Example 3

A foamed member was obtained in the same manner as in Example 1 except that a mixed solvent of toluene/methyl ethyl ketone (weight ratio: former/latter=80/20) was added to a thermoplastic polyester-based resin (trade name "Viron 29SS" manufactured by Toyobo Co., Ltd.; glass transition temperature: 64° C., solid matter concentration: 30% by weight) to dilute the solid matter concentration to 25% by weight and the resulting one was applied onto one surface of the foamed structure A in an application amount of 17 g/m$^2$ as dry weight (solid matter weight).

Example 4

A foamed member was obtained in the same manner as in Example 1 except that a mixed solvent of toluene/methyl ethyl ketone (weight ratio: former/latter=80/20) was added to a thermoplastic polyester-based resin (trade name "Viron 30SS" manufactured by Toyobo Co., Ltd.; glass transition temperature: 9° C., solid matter concentration: 30% by weight) to dilute the solid matter concentration to 25% by weight and the resulting one was applied onto one surface of the foamed structure A in an application amount of 15 g/m$^2$ as dry weight (solid matter weight).

Example 5

A mixed solvent of toluene/methyl ethyl ketone (weight ratio: former/latter=80/20) was added to a thermoplastic polyester-based resin (trade name "Viron 30SS" manufactured by Toyobo Co., Ltd.; glass transition temperature: 9° C., solid matter concentration: 30% by weight) to dilute the solid matter concentration to 25% by weight and further, trade name "Colonate L" (manufactured by Nippon Polyurethane Industry Co., Ltd.) was added in a ratio of 1 part by weight relative to 100 parts by weight of the thermoplastic polyester-based resin as a crosslinking agent. Then, the resulting one was applied onto one surface of the foamed structure A in an application amount of 12 g/m$^2$ as dry weight (solid matter weight). Thereafter, the whole was heated to 110° C. for 3 minutes and dried and then aged at 50° C. for 2 days to form a thermoplastic polyester-based resin layer (coat layer) on the surface of the foamed structure, thereby a foamed member being obtained.

Example 6

A foamed member was obtained in the same manner as in Example 5 except that a mixed solvent of toluene/methyl ethyl ketone (weight ratio: former/latter=80/20) was added to a thermoplastic polyester-based resin (trade name "Viron 30SS" manufactured by Toyobo Co., Ltd.; glass transition temperature: 9° C., solid matter concentration: 30% by weight) to dilute the solid matter concentration to 25% by weight, further, trade name "Colonate L" (manufactured by Nippon Polyurethane Industry Co., Ltd.) was added in a ratio of 3 parts by weight relative to 100 parts by weight of the thermoplastic polyester-based resin as a crosslinking agent, and then the resulting one was applied onto one surface of the foamed structure A in an application amount of 14 g/m$^2$ as dry weight (solid matter weight).

Example 7

A foamed member was obtained in the same manner as in Example 5 except that a mixed solvent of toluene/methyl ethyl ketone (weight ratio: former/latter=80/20) was added to a thermoplastic polyester-based resin (trade name "Viron 30SS" manufactured by Toyobo Co., Ltd.; glass transition temperature: 9° C., solid matter concentration: 30% by weight) to dilute the solid matter concentration to 25% by weight, further, trade name "Colonate L" (manufactured by Nippon Polyurethane Industry Co., Ltd.) was added in a ratio of 5 parts by weight relative to 100 parts by weight of the thermoplastic polyester-based resin as a crosslinking agent, and then the resulting one was applied onto one surface of the foamed structure A in an application amount of 18 g/m$^2$ as dry weight (solid matter weight).

Example 8

A foamed member was obtained in the same manner as in Example 1 except that a mixed solvent of toluene/methyl ethyl ketone (weight ratio: former/latter=80/20) was added to a thermoplastic polyester-based resin (trade name "Viron GK-110" manufactured by Toyobo Co., Ltd.; glass transition temperature: 42° C., solid matter concentration: 100% by weight) to dilute the solid matter concentration to 25% by weight and the resulting one was applied onto one surface of the foamed structure A in an application amount of 10 g/m² as dry weight (solid matter weight).

Example 9

A toluene solution was added to a thermoplastic elastomer resin (trade name "SIS 5405" manufactured by JSR Corporation; a styrene-isoprene-styrene-based thermoplastic elastomer resin; content ratio of styrene components: 18% by mol) to dilute the solid matter concentration to 20% by weight and the resulting one was applied onto one surface of the foamed structure A in an application amount of 15 g/m² as dry weight (solid matter weight) by a Mayer bar. Thereafter, the whole was heated to 80° C. for 3 minutes and dried to form a thermoplastic elastomer resin layer (coat layer) on the surface of the foamed structure, thereby a foamed member being obtained.

Example 10

A foamed member was obtained by forming a thermoplastic elastomer resin layer (coat layer) on the surface of the foamed structure in the same manner as in Example 9 except that trade name "SIS 5002" (manufactured by JSR Corporation; a styrene-isoprene-styrene-based thermoplastic elastomer resin; content ratio of styrene components: 22% by mol) was used instead of the trade name "SIS 5405" (manufactured by JSR Corporation).

Example 11

A foamed member was obtained by forming a thermoplastic elastomer resin layer (coat layer) on the surface of the foamed structure in the same manner as in Example 9 except that trade name "Septon 2104" (manufactured by Kuraray Co., Ltd.; a styrene-isoprene-styrene-based thermoplastic elastomer resin; content ratio of styrene components: 65% by mol) was used instead of the trade name "SIS 5405" (manufactured by JSR Corporation).

Comparative Example 1

The foamed structure A was used as the foamed member as it was.

Comparative Example 2

A vinyl acetate-based resin emulsion (trade name "C-965" manufactured by Nippon Carbide Industries Co., Inc.) was applied onto one surface of the foamed structure A in an application amount of 20 g/m² as dry weight (solid matter weight). Thereafter, the whole was heated to 110° C. for 3 minutes and dried to form a vinyl acetate-based resin layer (coat layer) on the surface of the foamed structure, thereby a foamed member being obtained.

Comparative Example 3

A vinyl acetate-based emulsion resin (trade name "Nicazol TS-824" manufactured by Nippon Carbide Industries Co., Inc.) was applied onto one surface of the foamed structure A in an application amount of 15 g/m² as dry weight (solid matter weight). Thereafter, the whole was heated to 110° C. for 3 minutes and dried to form a vinyl acetate-based resin layer (coat layer) on the surface of the foamed structure, thereby a foamed member being obtained.

Evaluation

Adhesive strength was measured on the foamed members according to Examples 1 to 11 and Comparative Examples 1 to 3 by the following method of measuring adhesive strength and also re-workability was evaluated on the foamed members according to Examples 4 to 7 and Examples 9 to 11 by the following method of evaluating re-workability.

Method of Measuring Adhesive Strength

After each material to be measured was stored in an atmosphere of 23±2° C. and 50±5 RH % for 24 hours or more (pre-treatment conditions: in accordance with JIS Z 0237), a foamed member of 20 mm×120 mm was adhered under pressure to a carrier tape for foamed member (trade name "ECT-755" manufactured by Nitto Denko Corporation) of 30 mm×120 mm by reciprocating a roller of 2 kg once at the same atmosphere and the whole was allowed to stand for about 30 minutes to prepare a sample for evaluation. The carrier tape for foamed member is adhered to a support plate (e.g., a bakelite plate having a thickness of 2 mm) though a strongly adhering double-sided adhesive tape (trade name "No. 500" manufactured by Nitto Denko Corporation) without blister and exfoliation from the support plate at measurement. Then, force required for peeling the foamed member was measured under each condition of a tensile rate of 10 m/min (high-speed peeling) or 0.3 m/min (low-speed peeling) at a temperature of 23±2° C., a humidity of 50±5 RH %, and a peeling angle of 180° to determine adhesive strength (N/20 mm) and also a peeled state at the peeling was visually confirmed. In this connection, the evaluation of the pressure-sensitive adhesive strength (adhesive strength) at high-speed peeling (tensile rate: 10 m/min) was conducted using a high-speed peeling test machine (manufactured by Tester Sangyo Co., Ltd.) and the evaluation of the pressure-sensitive adhesive strength (adhesive strength) at low-speed peeling (tensile rate: 0.3 m/min) was conducted using a universal tensile compression test machine (trade name "TCM-1kN B" manufactured by Minebea Co., Ltd.). The results of the measurements were shown in the columns of "high-speed peeling" and "low-speed peeling" in Table 1, respectively. In Table 1, the "interface" in the peeled state represents a fact that peeling occurs at the interface between the foamed member and the carrier tape for foamed member and the "foam" represents a fact that peeling occurs in the foamed structure A of the foamed member (i.e., foam breakage occurs).

Method of Evaluating Re-Workability

A foamed member was arranged to each of various adherend (an acrylonitrile-butadiene-styrene copolymer plate, an acrylic resin plate, a glass plate, and a stainless steel plate) so that the coat layer of the foamed member (either side in the case of the foamed member according to the Comparative Example 1) comes into contact with the adherend and the whole was kept at 50° C. for 7 days in such a compressed state that the thickness of the foamed member becomes 50% of its initial thickness. Thereafter, it was cooled to room temperature and then the foamed member was peeled from each adherend. The peeled state at the peeling was visually observed and re-workability was evaluated according to the following evaluation standards. The evaluation results are shown in Table 2. Specifically, the results were shown in the column of "ABS" in Table 2 in the case that the adherend is the acrylonitrile-butadiene-styrene copolymer plate, in the column of "Acryl" in Table 2 in the case that the adherend is the acrylic resin plate, in the column of "Glass" in Table 2 in the case that the adherend is the glass plate, and in the column of "SUS" in Table 2 in the case that the adherend is the stainless steel plate, respectively.

Evaluation Standards for Re-Workability

○: Peeling occurs at the interface between the foamed member and the adherend.

Δ: Part of the coat layer or the foamed structure A of the foamed member remains attached on the surface of the adherend.

X: Peeling occurs in the foamed structure A of the foamed member.

TABLE 1

| | High-speed peeling | | Low-speed peeling | |
|---|---|---|---|---|
| | Pressure-sensitive adhesive strength (N/20 mm) | Peeled state | Pressure-sensitive adhesive strength (N/20 mm) | Peeled state |
| Example | | | | |
| 1 | 2.6 | interface | 0.90 | interface |
| 2 | 2.4 | interface | 0.96 | interface |
| 3 | 2.5 | interface | 0.85 | interface |
| 4 | 2.5 | interface | 0.77 | interface |
| 5 | 2.5 | interface | 0.67 | interface |
| 6 | 2.4 | interface | 0.65 | interface |
| 7 | 2.4 | interface | 0.70 | interface |
| 8 | 2.4 | interface | 0.71 | interface |
| 9 | 2.30 | interface | 0.60 | interface |
| 10 | 2.30 | interface | 0.70 | interface |
| 11 | 1.60 | interface | 0.15 | interface |
| Comparative Example | | | | |
| 1 | 3.0 or more | foam | 0.87 | interface |
| 2 | 3.0 or more | foam | 1.13 | interface |
| 3 | 3.0 or more | foam | 1.14 | interface |

TABLE 2

| | | Re-workability | | | |
|---|---|---|---|---|---|
| | | ABS | Acryl | Glass | SUS |
| Example | 4 | Δ | Δ | Δ | ○ |
| | 5 | Δ | ○ | ○ | ○ |
| | 6 | ○ | ○ | ○ | ○ |
| | 7 | ○ | ○ | ○ | ○ |
| | 8 | ○ | ○ | ○ | ○ |
| | 9 | ○ | ○ | ○ | ○ |
| | 10 | ○ | ○ | ○ | ○ |

As is apparent from Table 1, since the foamed member according to each Example has the coat layer of the thermoplastic polyester-based resin or the thermoplastic elastomer resin (thermoplastic polyester-based resin layer or thermoplastic elastomer resin layer), strength of the surface of the foamed member can be enhanced and thus foam breakage at the peeling from the carrier tape is prevented in both cases of the high-speed peeling and the low-speed peeling. On the other hand, since the foamed member according to Comparative Example 1 does not have a coat layer and the foamed members according to Comparative Examples 2 and 3 have a coat layer of a vinyl acetate resin, the foam breakage where the surface of the foamed member is broken occurs.

Therefore, even in the case of the high-speed peeling, it is confirmed that the foam breakage at the peeling of the foamed member from the carrier tape can be inhibited or prevented by providing a coat layer of the thermoplastic polyester-based resin or the thermoplastic elastomer resin on the surface of the foamed member.

Moreover, as is apparent from Table 2, when the thermoplastic polyester-based resin layer is a thermoplastic polyester-based resin layer having a structure where a thermoplastic polyester-based resin is crosslinked, it is confirmed that re-workability is further enhanced and thus more preferred results are obtained.

While the invention has been described in detail and with reference to specific embodiments thereof, it will be apparent to one skilled in the art that various changes and modifications can be made therein without departing from the spirit and scope thereof.

The present application is based on Japanese Patent Application No. 2005-112415 filed on Apr. 8, 2005 and Japanese Patent Application No. 2006-049538 filed on Feb. 27, 2006, and the contents are incorporated herein by reference.

INDUSTRIAL APPLICABILITY

The present invention provides a foamed member capable of inhibiting or preventing foam breakage at the time when the foam member is peeled from a carrier tape, even when the foamed member has a high expansion ratio, as well as a foamed member laminate, and an electric or electronic device using the foamed member.

The invention further provides a foamed member excellent in re-workability, a foamed member laminate, and an electric or electronic device using the foamed member.

The invention claimed is:

1. A foamed member laminate comprising a foamed member and a carrier tape supporting the foamed member,
   wherein the foamed member comprises a thermoplastic resin foam layer containing a thermoplastic resin foam formed through a step of impregnating a high-pressure inert gas into a thermoplastic resin and subsequently reducing pressure; and
   at least one of a thermoplastic polyester-based resin layer and a thermoplastic elastomer resin layer disposed on at least one side of the thermoplastic resin foam layer,
   wherein the thermoplastic resin foam layer has an apparent density of 0.2 g/cm$^3$ or less,
   wherein the thermoplastic polyester-based resin layer comprises a thermoplastic polyester-based resin having a glass transition temperature of from 9° to 64° C.,
   wherein even after the foamed member is adhered to an acrylic resin plate or a stainless steel plate in a compression state and aged at 50° C. for 7 days, the foamed member is peeled without breakage,
   wherein the foamed member is adhered to the carrier tape in such a way that a surface of the thermoplastic polyester-based resin layer or the thermoplastic elastomer resin layer of the foamed member is brought into contact with a pressure-sensitive adhesive surface of the carrier tape, and
   wherein the foamed member is easily peelable from the carrier tape without foam breakage.

2. The foamed member laminate according to claim 1, wherein the thermoplastic resin constituting the thermoplastic resin foam layer is a polyolefin-based resin.

3. The foamed member laminate according to claim 1, wherein the thermoplastic polyester-based resin layer has a structure in which said thermoplastic polyester-based resin is crosslinked.

4. The foamed member laminate according to claim 1, wherein said thermoplastic elastomer resin constituting the thermoplastic elastomer resin layer is a thermoplastic elastomer resin having a content ratio of a hard segment portion of less than 50% by mol.

5. The foamed member laminate according to claim 1, wherein said thermoplastic elastomer resin constituting the thermoplastic elastomer resin layer is a styrene-isoprene-styrene-based thermoplastic elastomer resin.

* * * * *